Patented Apr. 13, 1948

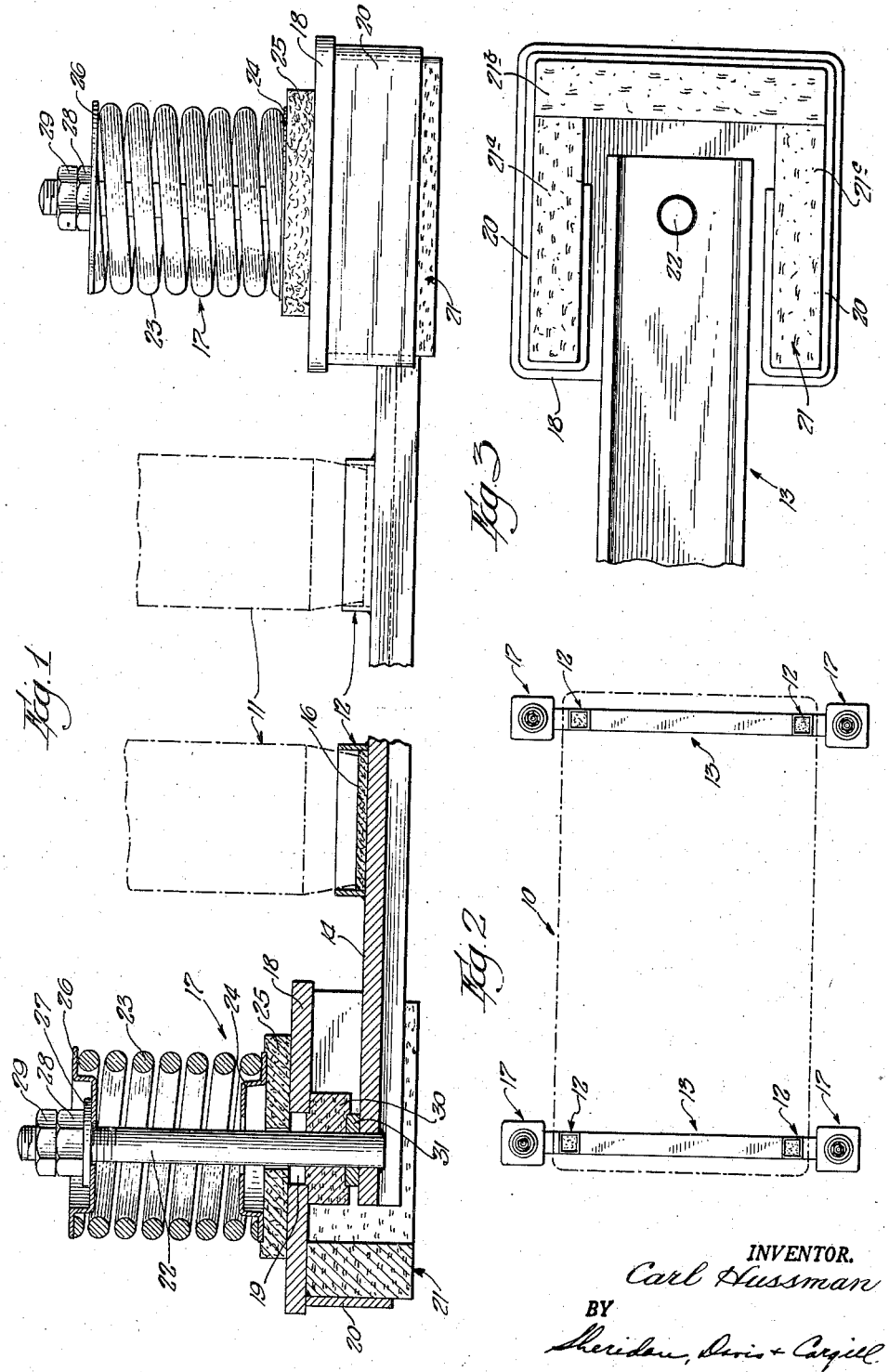

2,439,739

UNITED STATES PATENT OFFICE 2,439,739

VIBRATION ABSORBING MOUNTING

Carl Hussman, Chicago, Ill.

Application May 17, 1946, Serial No. 670,653

8 Claims. (Cl. 248—21)

This invention relates to vibration absorbing mountings.

In the use of business or office machines, such as some motor driven tabulating machines, mailing machines, duplicating machines and the like, frequently the vibrations resulting from operation of the machines are very objectionable not only to workers in the immediate location of the machines but also to those on other floors of the same buildings. Such motor operated machines are rather bulky generally and may weigh several hundred pounds and, resting upon the floor of an office, have presented vibration absorbing problems that have been difficult to solve. One reason for the difficulty is the fact that such machines generate vibrations that range from relatively low to high frequencies. No single type of cushioning or absorbing material has been found that will give equal correction against the transmission of vibrations of the encountered frequencies. Hence, placing organic cushioning material under the legs of such machines may give some correction to the transmission of relatively high frequency vibrations to the floor of the building that result in audible sound. However, the weight of such machines usually is not equally distributed to all legs of the machine, generally four in number, with the result that cushioning pads of rubber, felt, cork or the like placed under the legs are not uniformly compressed. For example, one or more of the pads may be slightly compressed, thus not affording the maximum high frequency absorption of which the particular material is capable, while the other pads may be compressed beyond their elastic limits and thus afford little or no protection against transmission of either high or low frequency vibrations.

The use of metallic springs in providing a floating mounting for such machines has also presented difficulties since springs, which while under compression provide excellent means for isolating low frequency vibrations, afford but little absorbing value insofar as high frequency vibrations are concerned and a floating mounting offers but little stabilizing resistance to side sway.

Notwithstanding that such business machines and many other types of machines with which the present improvements are adapted for use, usually do not have their total weights distributed for support equally by the legs of the machine, it is quite essential that any vibration absorbing mounting structure for such machine be capable of supporting the machine in the proper level position not only to insure proper operation of the machine, but for the convenience of the operator also. In addition, unbalanced forces usually are produced during operation of such machines which tend to cause side-sway, that is, oscillatory movement of the machine in horizontal directions, and hence conventional floating supports, which do not suppress such horizontal movements, generally are not satisfactory.

It is an object of the present invention to provide a vibration and noise absorbing mounting for machines of the type mentioned, as well as for machines of other types, which is capable of absorbing those high frequency vibrations which, if transmitted to a supporting floor, table or the like, produce distributing noises, as well as relatively low frequency vibrations which may produce annoying vibrations in the floor or other supporting structure.

An additional object of the invention is to provide a vibration absorbing mounting provided with stabilizing means that suppresses swaying movements of the supported machine while inhibiting transmission to the mounting, and thence to the supporting floor, those vibrations that are incident to the forces that tend to induce such swaying or horizontal movements of the machine.

Another object of the invention is to provide a vibration absorbing mounting that is adjustable for raising or lowering the superjacent portions of the supported machine, such as the legs or corners of the base of the machine, whereby the machine can be adjusted to a proper operating level without impairing the vibration absorbing characteristics of the mounting.

Other features of the invention relate to features of construction and arrangement of parts which will be apparent from a consideration of the following specification and accompanying drawings, wherein, Figure 1 is a broken side elevation of an improved mounting structure that is illustrative of the invention, one of the two vibration absorbing units illustrated in the figure being shown in vertical section.

Fig. 2 is a top plan view of the improved mounting, a machine having four supporting legs, such as a conventional business machine, being indicated diagrammatically in position on the mounting.

Fig. 3 is a broken bottom plan view of one of the four vibration insulating units shown in Fig. 2.

In the accompanying drawings, 10 indicates generally a machine that is supported by the improved mounting, the machine having four legs 11 each adapted to be positioned within a seat 12 of the mounting. The mounting comprises, in the structure illustrated, two similar sections 13 that may be, but preferably are not united, but are adapted each for supporting two of the legs of the machine or an end or side of the machine where no legs are provided. Thus in Fig. 2, the machine 10 is shown with legs of one side of the machine resting in the two seats 12 of one of the two mounting sections and the two legs at the other side of the machine resting in the two seats 12 of the other mounting section. The two seats 12 of each section 13 are spaced apart upon a bar 14 the requisite distance for receiving the bottom ends of the legs or feet of the machine. The two bars 14 are shown as being of inverted channel form to the upper plane surfaces of which the seats are attached. The bars, in effect, constitute a supporting base for the machine 10. The seats 12 are shown as comprising rectangular shaped rails 15 of metal which may be welded to the bars 14 and provided with pads 16 of vibration absorbing material, such as felt, upon which the feet or ends of the respective legs rest as illustrated in Fig. 1.

Vibration absorbing units 17 are provided for supporting the ends of the bars 14. The units 17 are of similar construction and the details of one of the same are shown in section in Fig. 1 and one of the units only will be described in detail.

Each of the units 17 referred to comprises a plate 18 provided with a central opening 19 therein. To the lower surface of the plate 18 is secured a rail 20 shaped as illustrated in Fig. 3, to provide a confining socket for a high frequency vibration insulator 21 which in use may rest directly upon a floor or other supporting structure. Such insulator preferably comprises natural cork, and in Fig. 3 the insulator is shown as comprising 3 cork slabs 21$^a$, 21$^b$, 21$^c$ of proper lengths and thickness to fit snugly in the relation shown in Fig. 3 for confinement by the rail 20. The height of the slabs is greater than that of the rails whereby the total weight of the mounting and the machine resting thereon is borne by the insulators 21 of the four units 17. The height of the insulators 21 and the thickness and length thereof are important since the efficiency of an organic insulating material, such as cork, in absorbing vibrations increases as the material is compressed, provided the degree of compression is short of the elastic limit of the material. Hence, a proper mass of cork for each insulator is desirable. Thus, where the weight of the machine supported by the improved insulating structure is from 500 to 600 lbs. and the cork slabs are approximately 3/4" thick and 1½" in height and having a combined length of 10 to 11 inches in each unit, there will be an average vertical compression of the slabs of approximately $\frac{3}{16}$", which is short of the elastic limit of the mass of cork provided and the insulators will absorb a high proportion of those relatively high frequency vibrations from the machine which, if transmitted to the floor would produce objectionable noise.

Secured to the adjacent end of the bar 14, as shown in Fig. 1, is an upstanding stud 22 that passes through the opening 19 in the plate 14 and around which stud is positioned a compression spring 23. The lower end of the spring is mounted on a spring cup or retainer 24 which rests upon a felt pad or the like 25 which in turn rests upon the plate. A second spring retainer 26 is positioned over the upper end of the spring and is provided with an aperture through which extends the upper threaded end of the stud 22. A washer 27 is shown on the retainer beneath the nut 28 while a lock or jam nut 29 is shown above the nut 28 to lock the latter in adjusted position.

Between the end of the bar 14 and the plate 18 as viewed in the sectional unit of Fig. 1, there is provided a stabilizer member 30 which preferably is a block or pad of organic vibration absorbing material such as natural cork. The block 30 has an aperture through which the stud 22 passes, as shown in Fig. 1, for retaining the block in proper position. The block has an upper and lower surface substantially greater in area than the area of the aperture 19 while below the block is a disc or washer-like member 31 having a diameter the same as that of the aperture.

When a machine 10 is placed upon the mounting sections, the weight of the machine tends to compress the springs and lower the bar. Since the weight of such a machine is not equally distributed generally, the springs may not all be compressed equally and hence the machine may not stand at the desired level. To level the machine, the nuts 32 of the units 17 are tightened, or such of them as may be necessary to cause the machine to stand at a proper operating level. If necessary, all the nuts 32 will be tightened or screwed downwardly not only to level the machine but to compress the springs 23 and thereby effect a compression of the blocks 30. As shown in Fig. 1, the disc 31 is of the same diameter as the aperture 19, and by reason of the compressive force exerted against a superjacent portion of the block 30, the disc causes a cylindrical portion of the block to protrude upward slightly into the aperture. Such stressing of the blocks in shear enables them to exert a stabilizing effect by resisting horizontal vibratory movement of the suspended studs and bars in all horizontal directions and to absorb most effectually the high frequency vibrations that originate in the machine and tend to travel horizontally along the suspended bars. Such effective stabilization of the supported machine without providing a path through which lateral vibrations are freely transmissible, is an important aspect of the present improvements since without an effective means for restraining the machine against swaying movement, a vibration insulating mounting may be impractical by rendering it difficult, if not impossible, for the operator to operate the machine.

In selecting springs 23 of suitable compressive resistance for a machine 10 of a given weight, it is desirable that the springs be sufficiently soft so that the proportion of the total load to be borne by the particular springs will effect substantial compression of the springs without contact of the adjacent turns or convolutions thereof. Compression springs are most effective in absorbing low frequency vibrations where the springs are under a high degree of compression, short of total compression.

The springs employed must be sufficiently stiff or strong not only to support the load imposed on each without becoming fully compressed but also sufficiently stiff to enable the stabilizer members 30 to be stressed in shear without effecting total compression of the springs. From the above it will be apparent that all the springs 30 of a given installation need not be of the same value in compressive resistance but that stiffer springs may be employed in a particular unit or units 17 of an installation that are to support the heavier individual loads imposed by a machine or unequally distributed weight. By employing springs of compressive resistance values that are relatively proportional to the loads to be imposed thereon all the springs will be compressed equally by the supported machine and when the springs are further compressed by tightening the nuts 27 in placing the stabilizer blocks 30 under substantially equal shear stresses, uniformity in both high and low frequency vibration absorption as well as stabilization will be afforded by the units 17. As a practical matter, however, satisfactory results generally will be attained where the springs are substantially of uniform stiffness, provided none of them becomes fully compressed in use.

The improved vibration absorbing mounting illustrated, as will be noted, elevates the machine 10 but a short distance above the floor, generally less than an inch where the flanges of the channel bars 14 are approximately ⅝" in vertical dimension. By inverting the channel bars 11 the vertical spacing of the machine above the floor can be reduced. Hence, use of the improvements is not objectionable to the machine operators as frequently is the case where an insulating mounting alters by several inches the normal operating level of a machine.

It will also be noted that the U-shaped base formed by the rails 20 and the vibrator insulators 21 of the unit 17 provides a space into which extends the adjacent end of the respective supporting bar 13. The bar, as indicated in Fig. 3 is of less width than the distance between the parallel arms of the U-shaped base and hence vibrations from the bar are not transmissible to the base except through the stud 22, which as above explained, is effectually insulated by tandemly arranged low and high frequency absorbing elements 23 and 25 against transmission of the vibrations to the unit and thence to the floor. Likewise such arrangement is of advantage in that the supported ends of the bar are disposed directly beneath the insulators 23, 25, and 30 which enables the supporting studs to be suspended vertically for avoiding distortion of the parts of the units. Hence, in instances where insulators 23, 25, or 30 or any of them must be made of greater vertical dimensions than those shown for illustrative purposes by reason of the weight of a particular machine to be supported by the mounting relatively longer studs 22 may be employed for spacing the bars 14 a minimum distance above the floor and thereby avoid altering substantially the preferred operating level of the machine.

While I have shown and described a structure that is illustrative of the invention, it will be seen that various changes in the details of the disclosures may be resorted to without departure from the spirit of the invention.

I claim:

1. A vibration insulating mounting for a machine comprising a pair of bars constituting a machine support, and vibration insulating units supporting said bars and each comprising an apertured plate above a portion of the bar and provided with downwardly extending floor contacting high frequency insulating means for spacing the bars above the floor, a compressible low frequency vibration absorbing member supported by the plate, a stud secured at one end to the bar and extending upwardly through the aperture of the plate and at the upper portion attached for support to the upper portion of said low frequency vibration absorbing member, a high frequency vibration absorbing element between the apertured portion of said plate and subjacent portion of the bar, said element being of greater area than the area of said aperture, and adjusting means for said stud whereby the supported portion of the bar can be elevated relative to said plate for stressing in shear the portion of said high frequency absorbing element that registers with said aperture for effecting stabilization of the bar against vibratory movements in horizontal directions.

2. A vibration insulating mounting provided with a machine supporting base comprising a pair of bars provided with upstanding studs at the ends thereof, and vibration insulating units each cooperating with one of said studs for supporting the bars above a floor, each of said units comprising a horizontal plate provided with an aperture of greater diameter than the diameter of the studs and through which aperture the respective stud extends, a low frequency vibration absorbing element above the plate operatively attached to the upper portion of the respective stud and adapted to be placed under partial compression by the load imposed on the base, a high frequency absorbing element surrounding said stud between said plate and bar and of greater horizontal area than said aperture, a shear member beneath said high frequency absorbing element, and adjusting means on the stud for increasing the compressive stress on the low frequency absorbing element and cooperating with said shear member for stressing in shear the portion of said high frequency element positioned directly beneath said aperture for effecting stabilization of the base against horizontal vibratory movements.

3. A vibration insulating mounting provided with a machine supporting base comprising a pair of bars provided with upstanding studs adjacent the ends thereof, and vibration insulating units each adapted for cooperation with one of said studs for supporting said bars above a floor, said units comprising a horizontal plate provided with downwardly extending floor-contacting vibration absorbing means, a high frequency vibration absorbing pad on said plate, a low frequency vibration absorbing spring supported on said pad, said plate having an aperture therein of greater diameter than the diameter of the respective stud and through which aperture said stud extends, adjusting means operatively attaching the upper portion of the stud to the upper portion of said spring whereby the stud is suspended from the spring and enabling the stud and adjacent portion of the respective bar to be adjusted vertically with respect to the plate, a compressible vibration absorbing element disposed between said bar and plate of a facial area greater than the area of the aperture, and a shear member beneath said element of the diameter of said aperture for stressing in shear the portion of the element aligned with said aperture as said stud is moved relatively upward through said aperture by said adjusting means.

4. A vibration absorbing mounting comprising a machine supporting base, a plurality of vibration absorbing units each comprising a plate provided with a floor-contacting member, suspending means supported by the respective plates for suspending the base above a floor and comprising vibration absorbing elements for absorbing vibrations that tend to travel from the base downwardly through the units, and a vibration absorbing element in each unit arranged to stabilize the respective base-suspending means against the induction of lateral oscillatory movements in the suspending means by horizontally traveling vibratory impulses transmitted to the suspending means from said base.

5. A vibration insulating mounting comprising a machine support having engageable end portions, a plurality of vibration insulating units each comprising a vibration absorbing element arranged for compression in a vertical direction, each unit comprising a base open at one side for accommodating insertion of one of said end portions of the support into a position axially beneath the respective element, and suspending means for each end portion of said support comprising a member engaging one of said end portions and supported by one of said elements and of a length to space the support above a floor.

6. A vibration insulating unit comprising an apertured horizontal plate provided with depending members defining a holder for a floor contacting vibration insulator having an open side for accommodating beneath said plate a laterally inserted portion of a machine supporting base, and a vertically deflectably vibration insulating means mounted on said plate for supporting a vertically arranged suspending member passing through said aperture into engagement with a portion of a machine supporting base beneath said plate.

7. A vibration insulating unit comprising an apertured horizontal plate provided on the lower surface with a floor contacting vibration insulator having an open side for accommodating the lateral insertion beneath said plate of an engageable portion of a machine supporting base, and deflectable low frequency and high frequency vibration absorbing elements arranged in tandem upon said plate coaxially with respect to the aperture thereof for supporting a suspension member extending through said aperture into engagement with a subjacent engageable portion of a machine supporting base.

8. A vibration insulating unit comprising an apertured horizontal plate provided on the lower surface with a floor contacting vibration insulator, said insulator being of U-shape providing an open side for accommodating lateral insertion beneath said plate of an engageable portion of a machine supporting base, a stud engaging said portion of the base and extending upwardly through said aperture out of contact with the wall thereof, compressible vibration absorbing means on said plate annularly disposed about said stud, and means supported by said absorbing means and engaging said stud for suspendingly supporting the latter and the portion of the base engaged thereby.

CARL HUSSMAN.

REFERENCES CITED

The following references are of record in the file of this patent:

UNITED STATES PATENTS

| Number | Name | Date |
| --- | --- | --- |
| 1,763,682 | Wallace | June 17, 1930 |
| 1,880,280 | Replogle | Oct. 4, 1932 |
| 2,144,848 | Miller | Jan. 24, 1939 |